United States Patent [19]

Kudoh

[11] Patent Number: 5,016,248
[45] Date of Patent: May 14, 1991

[54] BUFFER MEMORY DEVICE FOR PACKET DATA AND METHOD OF CONTROLLING THE DEVICE

[75] Inventor: Norimasa Kudoh, Kawasaki, Japan

[73] Assignee: Kabushiki Kaisha Toshiba, Kawasaki, Japan

[21] Appl. No.: 426,424

[22] Filed: Oct. 25, 1989

[30] Foreign Application Priority Data

Oct. 27, 1988 [JP] Japan .............................. 63-271601

[51] Int. Cl.$^5$ ............................................. H04J 3/24
[52] U.S. Cl. .................................. 370/94.1; 370/85.6; 340/825.5; 340/825.51
[58] Field of Search .................... 370/94.1, 60, 85.1, 370/85.6; 340/825.5, 825.51, 825.52; 364/200

[56] References Cited

U.S. PATENT DOCUMENTS

| | | | |
|---|---|---|---|
| 4,603,416 | 7/1986 | Servel et al. | 370/94.1 |
| 4,707,693 | 11/1987 | Hessel | 370/85.6 |
| 4,849,968 | 7/1989 | Turner | 370/94.1 |
| 4,864,495 | 9/1989 | Inaba | 370/94.1 |
| 4,864,560 | 9/1989 | Quinquis et al. | 370/94.1 |
| 4,890,226 | 12/1989 | Itoh | 364/200 |

*Primary Examiner*—Douglas W. Olms
*Assistant Examiner*—Alpus H. Hsu
*Attorney, Agent, or Firm*—Finnegan, Henderson, Farabow, Garrett, and Dunner

[57] ABSTRACT

A buffer memory device and method for fixed-length packet data. The write and read addresses of a memory are controlled by respectively independent pointer queues and these pointer queues are arranged to be distributed to the address data queue of any of the packet queues. When data are concentrated on a specific packet queue, the address data of packet queues low in use frequently are distributed so that the writable area of the specific packet queue can be expanded.

13 Claims, 6 Drawing Sheets

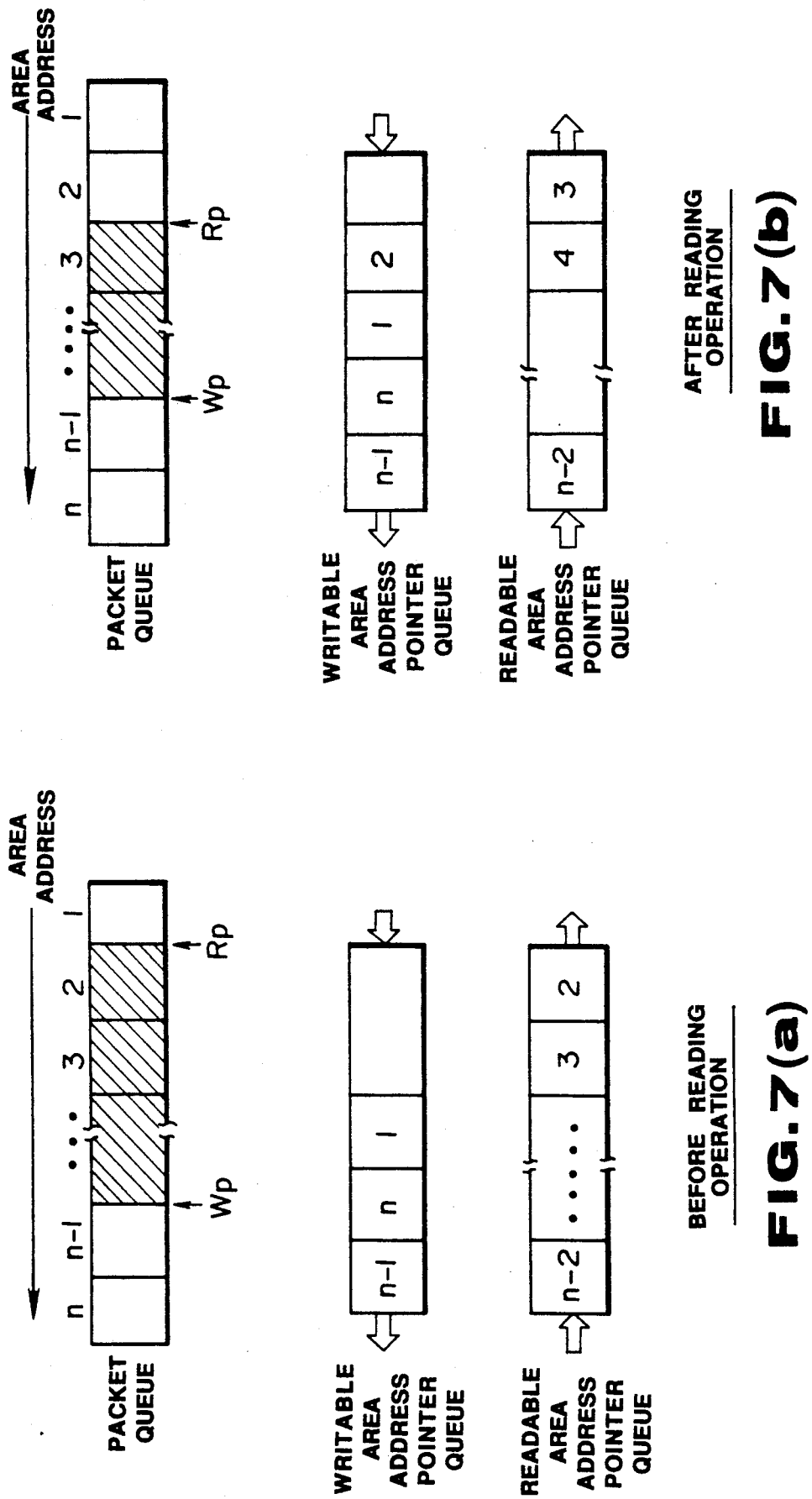

BUFFER MEMORY DEVICE FOR PACKET DATA AND METHOD OF CONTROLLING THE DEVICE

BACKGROUND OF THE INVENTION

1. Field of the Invention

The present invention relates to a buffer memory device for fixed-length packet data and a method of controlling the buffer memory device.

2. Description of the Related Art

An example of a network wherein voice data or the like are transmitted in packet units, is shown in FIG. 1. In the drawing, the network includes multiplex lines 1, packet exchanges 2A, 2B and 2C, packet terminals 3A to 3C, exchanges 4A to 4C and telephone sets 5A to 5C. A voice signal input to, for example, the packet terminal 3A is encoded and then resolved into predetermined unit data in the packet terminal 3A so that each of the predetermined data units is attached with a party destination data to prepare a packet. The packets thus prepared are transmitted through the packet exchanges 2A to 2B to the party packet terminal 3B.

FIG. 2 is a block diagram showing an interior arrangement of each of the packet exchanges 2A to 2C, which includes terminal interfaces TINFs provided as connected to associated packet terminals, a line interface LINF connected to multiplex lines 1, a controller CONT, a bus access controller ARB, an interrupt control bus BUS1, a control bus BUS2, an access control bus BUS3 and a data bus BUS4. The terminal interface TINF, when receiving a calling packet from the packet terminal connected thereto, sends an interrupt command through the interrupt control bus BUS1 to the controller CONT. The controller CONT, when confirming the received interrupt command, has access to a memory (not shown) provided within the terminal interface TINF to confirm the calling data (destination number, window size and so on). Thereafter, the controller CONT outputs an access request to the data bus BUS4 onto the access control bus BUS3 to transmit a connection request packet to the party packet terminal which forms an opposing node. When having acquired the data bus access authority, the controller CONT sends the connection request packet to the line interface LINF through the data bus BUS4. The line interface LINF itself, when receiving the connection request packet, prepares the connection request packet in the same manner as for the data packet and transmits it onto the multiplex line 1. In response to it, when the line interface LINF receives a connection approval or disapproval packet from the party packet terminal of the opposing node, the line interface sends the received packet to the controller CONT. The controller CONT, when receiving, for example, the connection approval packet, prepares a connection table in a memory (not shown) in the line interface LINF and the terminal interface TINF and sends the connection approval packet to the terminal interface TINF through the control bus BUS2. The terminal interface TINF responsive to the reception of the connection approval packet, transmits the packet to the associated packet terminal and thereafter is put in a data transmission phase. In the data transmission phase, the terminal interface TINF sends the data packet to the line interface LINF. In this case, the transmitted data packet comprises a data part D attached with header part H as shown in FIG. 3. The line interface LINF receiving the data packet stores it in the buffer and then transmits it to the multiplex line 1.

The above operation is similarly repeated even for the data packet in the data transmission phase. In the case of a disconnection, i.e., the connection disapproval packet, the same operation as in the connection request is carried out except that the connection table is deleted.

Shown in FIG. 4 is an internal arrangement (illustrating only packet or signal transmission directions to a multiplex line) of the line interface LINF which includes a data bus interface 4, an address coincidence detector (address filtering) 5, a packet distributor part 6, packet queues 7-1 to 7-n arranged in a plurality of rows and stored in a buffer memory BM, a transmission packet decider 8, and a line interface 9. The data bus interface 4, which forms an interface with the data bus BUS4 in FIG. 2, performs packet transmission and reception to and from the data bus BUS4 in accordance with the timing of the data bus BUS4. The address coincidence detector 5 compares the destination address of the received packet with its own address, sends the received packet to the packet distributor 6 when finding an address coincidence therebetween, and otherwise discards it. The packet distributor 6 determines, on the basis of the data in the header part H of the received packet, one of the packet queues 7-1 to 7-n in which the received packet is to be arranged. The data in the header part H include data relating to connection, priority associated with transmission delay, etc. On the basis of, for example, the priority data among these data, the packet distributer 6, distributes the received packet to one of the packet queues 7-1 to 7-n. The transmission packet decider 8 determines one of the packet queues 7-1 to 7-n from which a packet is to be taken out. The decision of the decider 8 is made by taking account of the priority, the number of staying packets in the packet queues and the past control totally. The line interface 9, which forms an interface with the multiplex line 1, transmits the decided packet to the multiplex line 1 in synchronism with the clock of the line 1.

Referring to FIG. 5, there is shown a configuration of one, for example, 7-1 of the packet queues 7-1 to 7-n, which inlcudes a two-port RAM 10 having two ports A and B, a write data bus 11, a read data bus 12, a port-A-side address bus 13, a port-B-side address bus 14, a write request 15, a read request 16, a port-A-side address pointer 17, a port-B-side address pointer 18, an up/-down counter (U/D counter) 19, a buffer controller 20, and access disable signals including a read disable signal 21R and a write disable signal 21W. Data access to the 2-port RAM 10 is carried out on a first-in first-out basis to read out data from the RAM in the sequence of written data.

With such an arrangement, the port-A-side address pointer 17, when receiving the write request 15, applies to a port-A-side address input terminal of the RAM 10 an address data indicative of the address (packet length interval) of an area of the RAM 10 in which writing is next to be realized, whereby the RAM 10 stores a packet received from the write data bus 11 in the area specified by the address data received from the pointer 17. Like the pointer 17, the port-B-side address pointer 18, when receiving the read request 16, similarly applies to a port-B-side address input terminal of the RAM 10 an address data indicative of the address (packet length interval) of an area of the RAM 10 from which reading is next to be realized, whereby the RAM 10 reads out a packet from the area specified by the address data received from the pointer 18 and outputs the read packet onto the data bus 12. The U/D counter 19, when receiving the write request 15, increments its count value by "1" while, when receiving the read request 16, the counter decrements its count value by "1", so that the count value indicates the number of staying packets in the packet queue 7-1. Thus, when the count value of the counter 19 becomes "1", the controller 20 judges that the number of staying packets in the queue 7-1 became "0", and outputs the read disable signal 21R to inhibit the reading of packets from the queue 7-1. When the count value of the counter 19 becomes a predetermined maximum, the controller 20 judges that the queue 7-1 is full of packets and outputs the write disable signal 21W to inhibit the writing of any packets.

Such an arrangement of the buffer memory BM as mentioned above has a problem in that, taking into consideration the fact that packets may be concentrated on a specific one of the packet queues, the capacity of the RAM 10 is determined so that the queues can have a relatively large length, which results in one of the queues being used infrequently which is uneconomical.

SUMMARY OF THE INVENTION

It is an object of the present invention to provide a buffer memory device for packet data which can eliminate the above problem in the prior art and which can efficiently packet data therein, and also to provide a method of controlling such a buffer memory device.

In accordance with the present invention, there is provided a buffer memory device for packet data which comprises, a plurality of packet queues for storing packet data therein, a plurality of first pointer queues provided as associated with the plurality of packet queues for storing therein pointers indicative of addresses of writable areas in the packet queues, respectively, a plurality of second pointer queues provided as associated with the plurality of packet queues for storing therein addresses of readable areas in the packet queues, respectively, and wherein a write address of a packet data to the packet queue is controlled on the basis of the pointers stored in the first pointer queues and wherein a read address of a packet data from the packet queue is controlled on the basis of the pointers stored in the second pointer queues, and, in a reading operation of a packet data from the packet queue, a pointer indicative of the address of one of the packet queues where the packet data has been so far stored, is shifted from an associated one of the second pointer queues to one of the first pointer queues.

Since the first and second pointer queues specifying the write and read addresses to and from the memory means are provided independently of each other and as associated with the packet queues respectively, even when packet data are concentrated on a specific packet queue, the address data of packet queues which are used infrequently are distributed so that the writable area of the specific packet queue can be expanded, whereby the packet buffer memory can be efficiently used.

In the present invention, since the write and read addresses are controlled by respective independent pointer queues and these pointer queues are arranged to be distributed to the address data queue of any of the packet queues, even though the length of the packet queues is constant, the invention can use another packet queue to create a packet queue having a desired length, whereby the memory device storing the packet queues therein can be efficiently used.

BRIEF DESCRIPTION OF THE DRAWINGS

FIGS. 7(a)–(l) shows diagrams for explaining the operation of the embodiment.

DESCRIPTION OF THE PREFERRED EMBODIMENTS

Figure 1:
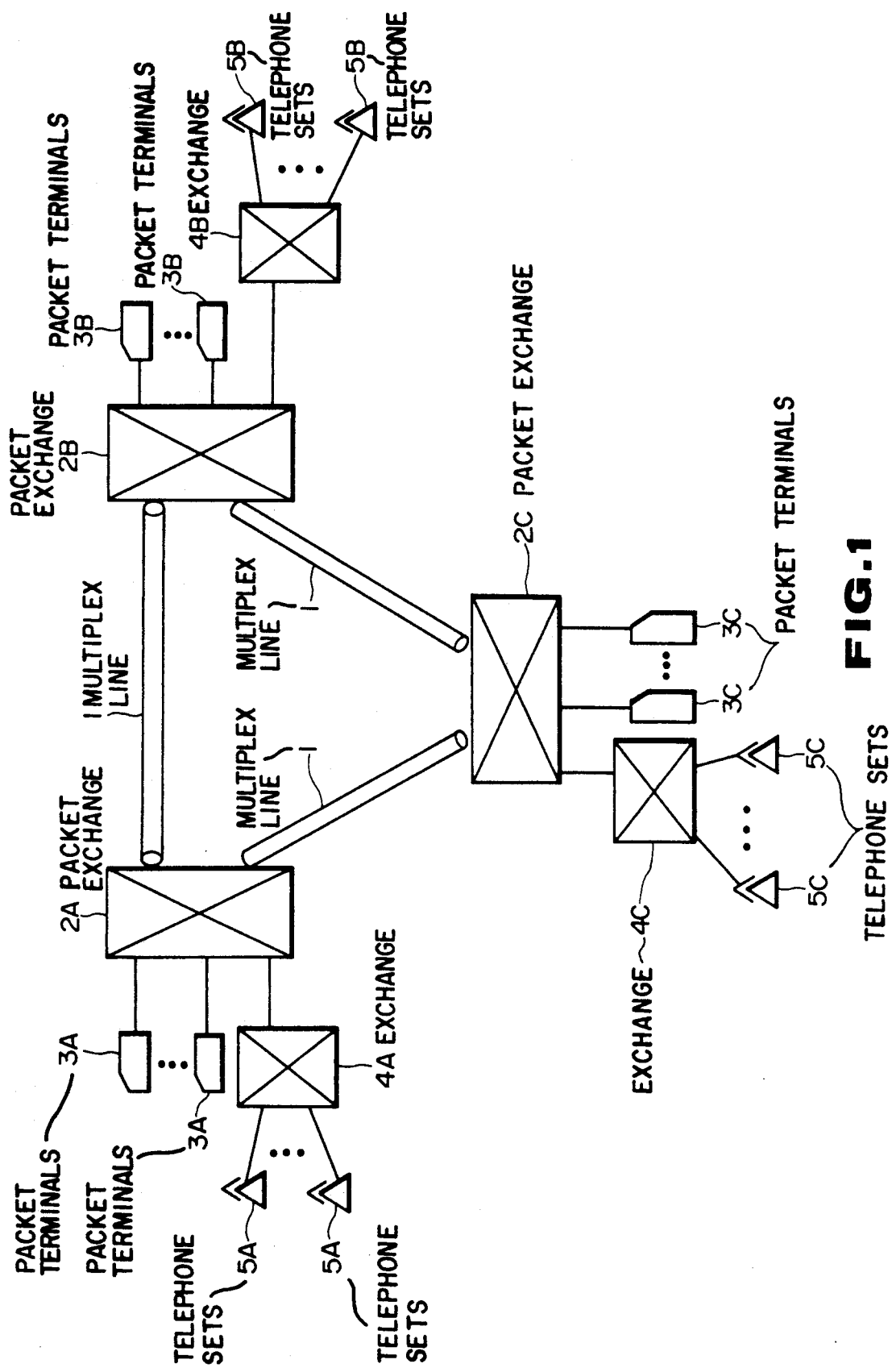
FIG. 1 shows an example of networks wherein data are transmitted in the form of a packet.
Figure 2:
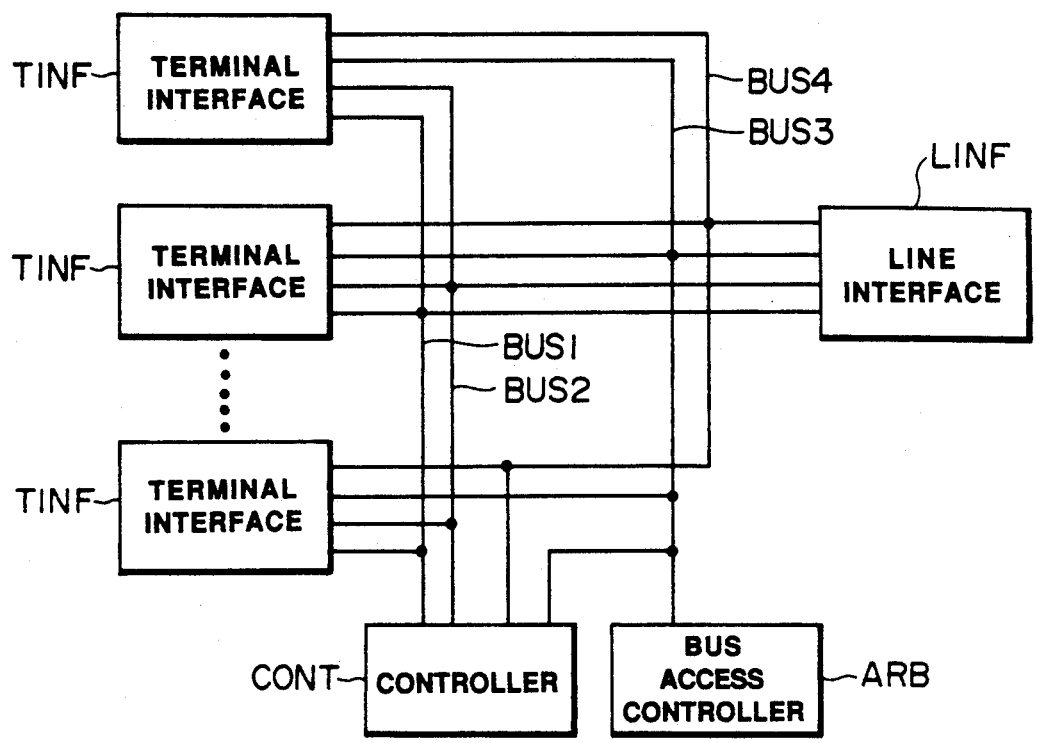
FIG. 2 is an interior arrangement of a packet exchange in FIG. 1.
Figure 3:
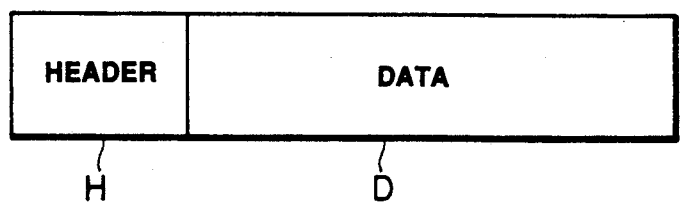
FIG. 3 shows the configuration of a packet.
Figure 4:
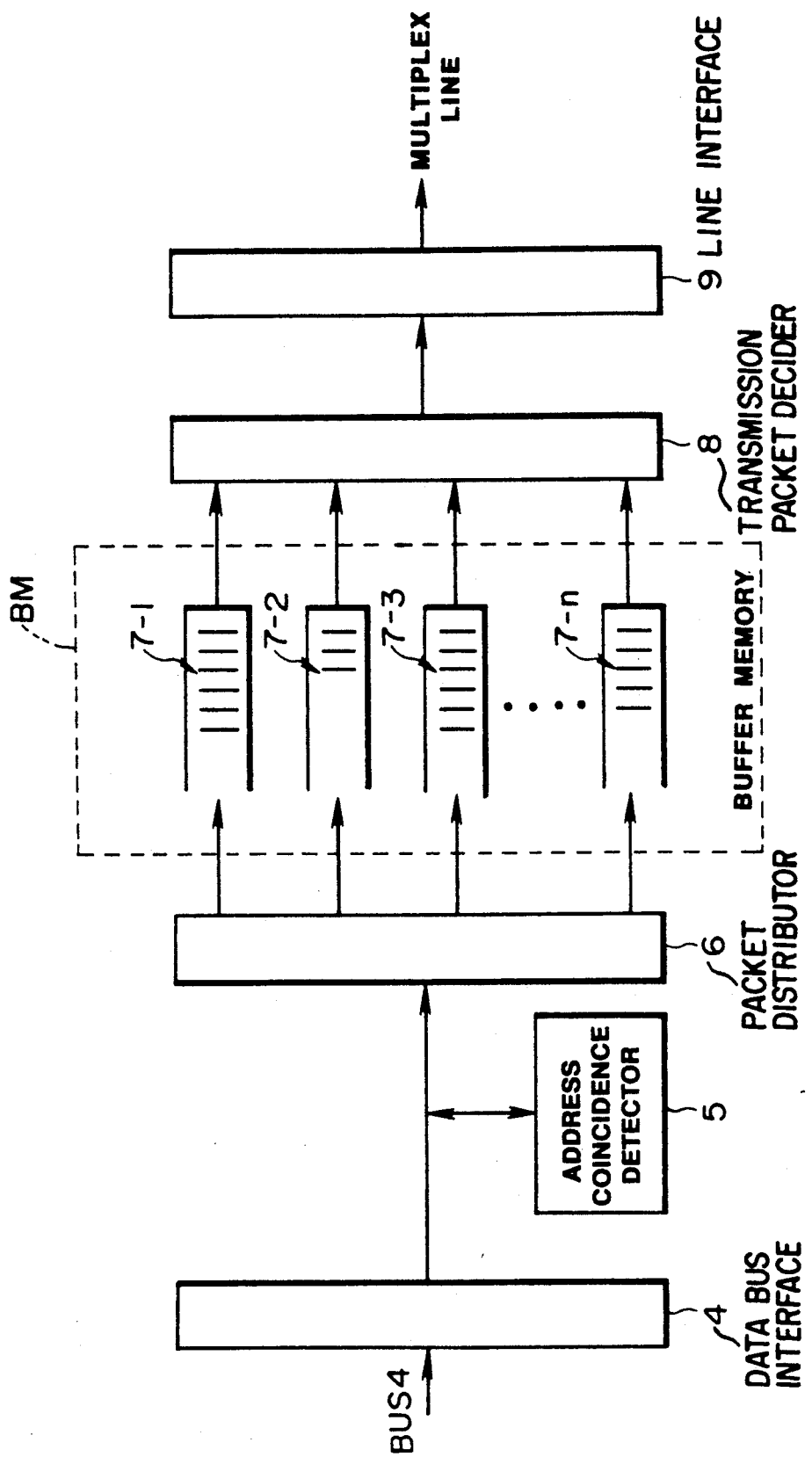
FIG. 4 is an arrangement of a prior art line interface comprising a buffer memory having a plurality of packet queues in which packets are stored.
Figure 5:
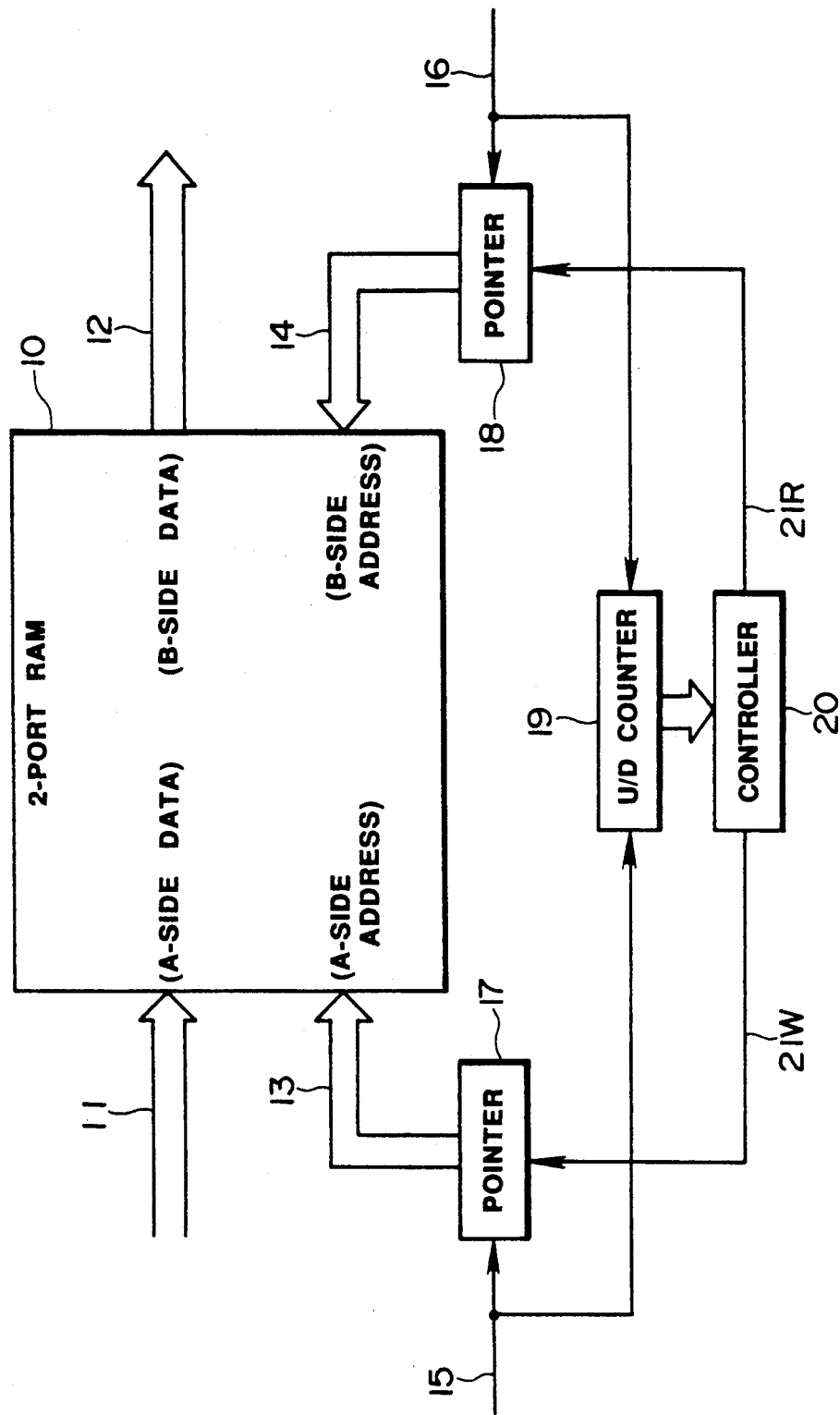
FIG. 5 is an arrangement of a prior art packet queue.
Figure 6:
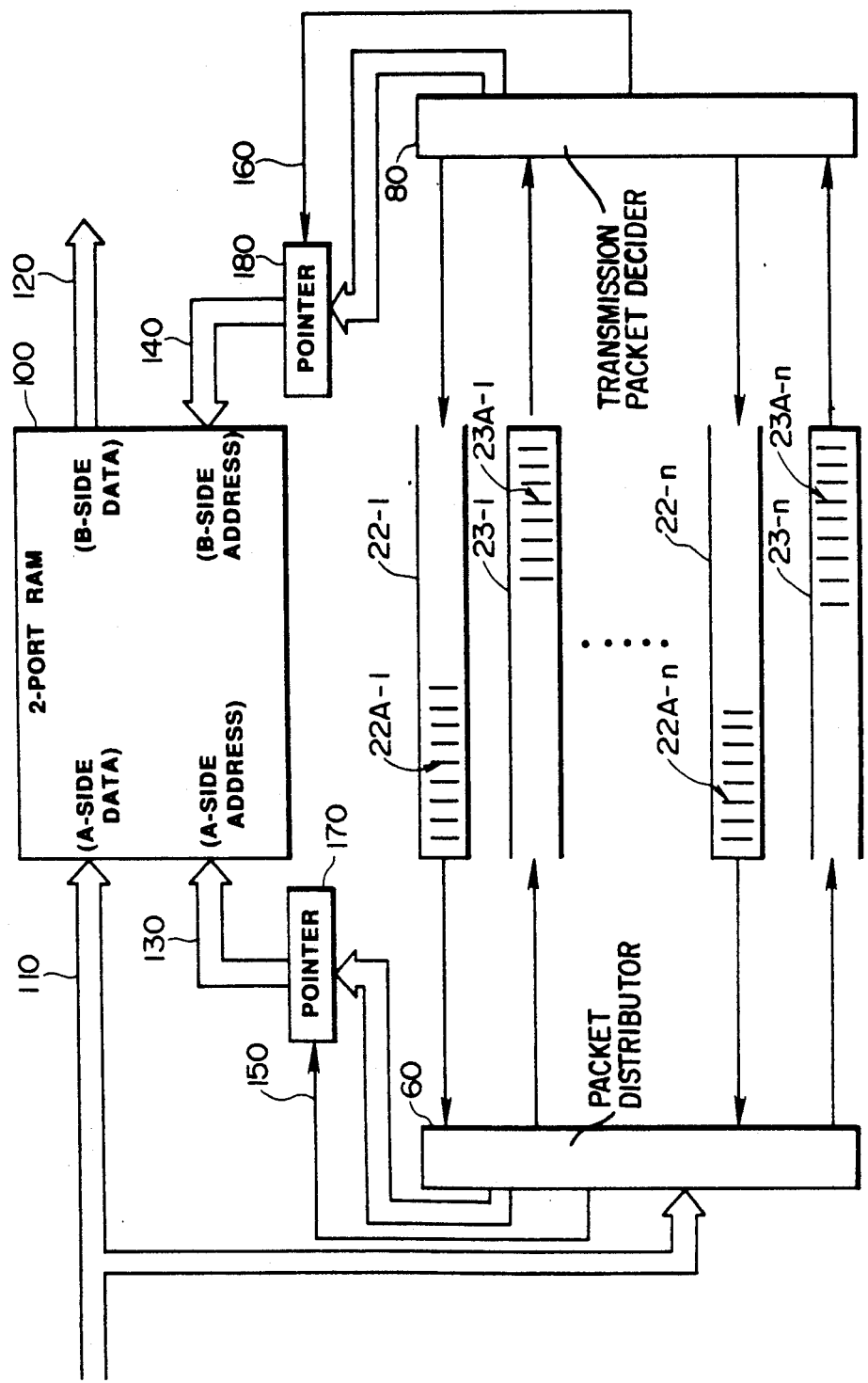
FIG. 6 is a block diagram showing an embodiment of a buffer memory device for packet data in accordance with the present invention.

Referring to FIG. 6, there is shown a major part of an embodiment of a buffer memory device for packet data in accordance with the present invention, which major part corresponds to a part of FIG. 4 including the packet distributer 6, the buffer memory BM and the transmission packet decider 8. Shown in the drawing are a 2-port RAM 100 having two ports A and B, a write data bus 110, a read data bus 120, a port-A-side address bus 130, a port-B-side address bus 140, a write request 150, a read request 160, a port-A-side address pointer 170, and a port-B-side address pointer 180. Stored in the 2-port RAM 100 are n packet queues.

Memories 22-1 to 22-n store therein queues 22A-1 to 22A-n for writable area address pointer therein respectively, and a plurality of pointers (address data) indicative of the areas of packets not used at the moment corresponding to the packet queues of the RAM 100 are queued in the form of the address pointer queues 22A-1 to 22A-n.

Memories 23-1 to 23-n store therein queues 23A-1 to 23A-n for readable area address pointers, and a plurality of pointers (address data) indicative of the areas of packets readable at the moment corresponding to the packet queues of the RAM 100 are queued in the form of the address pointer queues 23A-1 to 23A-n.

The port-A-side address pointer 170, when receiving the writing request 150, applies to a port-A-side address input terminal of the RAM 100 an address data indicative of the address (packet length interval) of an area of the RAM 100 next writable therein, so that the RAM 100 stores a packet received from the write data bus 110 in the area specified by the address data. On the other hand, the port-B-side address pointer 180, when receiving the read request 160, applies to a port-B-side address input terminal of the RAM 100 an address data indicative of the address (packet length interval) of an area of the RAM 100 next readable therefrom, so that the RAM 100 reads a packet from the area specified by the address data and outputs the read packet to the read data bus 120.

The operation of the embodiment will be explained by referring to FIGS. 7(a) and 7(b). More specifically, FIG. 7(a) shows the states, prior to reading operation, of a packet queue, a writable area address pointer queue 22A and a readable area address pointer queue 23A respectively, wherein hatched areas indicate areas in which packets are stayed, reference symbol Rp denotes the first pointer for the readable areas, and symbol Wp denotes the first pointer for the writable areas; while FIG. 7(b) shows the states, after reading operation, of the same queues as in FIG. 7(a).

When the pointed 180 receives the read request 160 from the transmission packet decider 80 and the RAM 100 reads out a single packet from associated one of the packet queues of the RAM, the pointer Rp is advanced by an amount corresponding to one packet. At this time, a pointer to an area number 2 of the readable area address pointer queue 23A used in the packet reading operation is shifted in the writable area address pointer queue 22A at a position next to an area number 1.

The transmission packet decider 80 can now shift the pointer of the accessed packet area in a desired one of the writable area address pointer queues 22A-1 to 22A-n positioned in a row i (i=1 to n). In the case where such a condition takes place that staying packets in a packet queue i become large in number and the writable areas become insufficient or short, with the aim of using the writable areas in another packet queue j which is low in use frequency, the transmission packet decider 80, at the stage of completing the one-packet reading operation of the queue j, shifts the then used readable-area address pointer in one of the writable area address pointer queues 22-1 to 22-n corresponding to a packet queue i (i=1 to n) for the area to be expanded.

Through such operation as mentioned above, the write area of the packet queue i can be expanded. That is, even when the length of the packet queues is set to be a predetermined constant value, there can be provided a packet buffer memory device which, when the length of a packet queue high in use frequency exceeds the predetermined length, can use another packet queue and can cope with such a packet queue length.

Although the packet queue illustrated in FIGS. 7(a)-(b) has been explained as having continuous areas for easy understanding, the queue may have a random area configuration.

The address pointer queues 22A-1 to 22A-n and 23A-1 to 23A-n have been set to be 2n in total number in the foregoing embodiment, but it requires less memory capacity and thus the present invention can have a small-scale circuit configuration.

What is claimed is:

1. A system for storing and reading data in a packet form, comprising:
   a plurality of packet queue means for storing input packet data therein;
   a plurality of first pointer queue means, each associated with a corresponding one of said packet queue means, for storing therein pointers indicative of addresses of writable areas in each of said packet queue means, respectively;
   a plurality of second pointer queue means, each associated with a corresponding one of said packet queue means, for storing therein pointers indicative of addresses of readable areas in each of said packet queue means, respectively;
   address control means for selecting an address of any one of said packet queue means to write packet data on the basis of the pointers stored in said first pointer queue means and for selecting an address of one of said packet queue means to read packet data on the basis of the pointers stored in said second pointer queue means; and
   pointer control means, operable in response to a reading operation of a packet data from one of said packet queue means, for deleting a pointer, indicative of the address of that packet queue means where said packet data had been stored, from the one of the second pointer queue means where said pointer had been stored and for writing said pointer into one of said first pointer queue means.

2. The system as set forth in claim 1, wherein each of said plurality of packet queue means comprises a predetermined memory area in a single 2-port random access memory, respectively.

3. The system as set forth in claim 1, wherein said address control means select an address of any one of said packet queue means to which a packet data is to be written on the basis of a priority data attached to said packet data.

4. The system as set forth in claim 1, wherein said packet data is of a fixed length.

5. The system as set forth in claim 1, wherein said first and second pointer queue means each comprise, respectively, a memory.

6. The system as set forth in claim 1, wherein said pointer control means determines one of said first pointer queue means in which pointers are to be written in response to a number of pointers stored in said first pointer queue means.

7. A system for storing and reading data in a packet form, comprising:
   a plurality of packet queue means for storing packet data therein;
   a plurality of first pointer queue means, each associated with a corresponding one of said packet queue means, for storing therein pointers indicative of addresses of writable areas of said packet queue means, respectively;
   a plurality of second pointer means, each associated with a corresponding one of said packet queue means, for storing therein pointers indicative of addresses of readable areas in each of said packet queue means, respectively;
   packet distributing means for selecting any one of said first pointer queue means on the basis of a priority data attached to an input packet data and for selecting an address of any one of said packet queue means in accordance with a pointer stored in said selected first pointer queue means to thereby write said input packet data into the one of the packet queue means corresponding to the selected first pointer queue means; and
   transmission packet deciding means for selecting any one of said second pointer queue means and for selecting an address of any one of said packet queue means in accordance with a pointer stored in said selected second pointer queue means to thereby read out packet data from one of said plurality of packet queue means, and, in response to a reading operation of packet data from the packet queue means, for deleting a pointer indicative of an address of the packet queue means where the read packet data had been stored from the second pointer queue means where said pointer had been stored and for writing the pointer into one of said first pointer queue means.

8. The system as set forth in claim 7, wherein each of said plurality of packet queue means comprises a predetermined memory area in a single 2-port random access memory, respectively.

9. The system as set forth in claim 7, wherein said packet data is of a fixed length.

10. The system as set forth in claim 7, wherein said first and second pointer queue means each comprise, respectively, a memory.

11. The system as set forth in claim 7, wherein said transmission packet deciding means determines one of said first pointer queue means in which a pointer is to be written in accordance with a number of pointers stored in said first pointer queue means.

12. A method of controlling a system for storing and reading data in a packet form, comprising the steps of:

selecting any one of a plurality of packet queue means in which a packet data is to be written on the basis of a priority data attached to said packet data;

selecting an address of said selected packet queue means on the basis of pointers stored in a plurality of first pointer queue means, each said first pointer queue means being associated with a corresponding one of said packet queue means, said pointers stored in said first pointer queue means being indicative of addresses of writable areas of said packet queue means;

selecting one of said plurality of packet queue means from which a packet data is to be read out;

selecting an address of said packet queue means on the basis of pointers stored in a plurality of second pointer queue means, each said second pointer queue means being associated with a corresponding one of said packet queue means, said pointers stored in said second pointer queue means being indicative of addresses of readable areas of said packet queue means; and deleting, in response to a reading of a packet data from a packet queue means, a pointer indicative of an address of the packet queue means where the packet data had been stored from the second pointer queue means where said pointer had been stored and writing said pointer into any one of said first pointer queue means.

13. The method as set forth in claim 12, wherein said packet data is a of a fixed length.

* * * * *